US011709658B2

(12) United States Patent
Eberlein et al.

(10) Patent No.: US 11,709,658 B2
(45) Date of Patent: Jul. 25, 2023

(54) COMPLIANCE ASSESSMENT AND SIMULATION SYSTEM (71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/554,069

(22) Filed: Dec. 17, 2021

(65) Prior Publication Data

US 2023/0195422 A1 Jun. 22, 2023

(51) Int. Cl.
  *G06F 8/10* (2018.01)
  *G06F 21/62* (2013.01)
  *G06F 8/75* (2018.01)
  *G06F 8/60* (2018.01)

(52) U.S. Cl.
  CPC ............... *G06F 8/10* (2013.01); *G06F 8/60* (2013.01); *G06F 8/75* (2013.01); *G06F 21/6245* (2013.01)

(58) Field of Classification Search
  CPC ..... G06F 8/10; G06F 8/60; G06F 8/75; G06F 21/6245
  USPC .................................. 717/107–127
  See application file for complete search history.

(56) References Cited

U.S. PATENT DOCUMENTS

| | | | | |
|---|---|---|---|---|
| 6,675,835 B2 * | 1/2004 | Gerner | ............. | G01N 30/36 96/10 |
| 6,907,546 B1 * | 6/2005 | Haswell | ............. | G06F 11/3684 717/124 |
| 7,072,843 B2 * | 7/2006 | Menninger | ............. | G06Q 20/203 705/16 |
| 7,603,358 B1 * | 10/2009 | Anderson | ............. | G06F 21/6227 |
| 7,870,075 B1 * | 1/2011 | Sabet | ............. | G06F 21/105 705/52 |
| 9,250,884 B2 * | 2/2016 | Ravi | ............. | G06F 9/44505 |
| 10,484,429 B1 * | 11/2019 | Fawcett | ............. | H04L 63/20 |
| 10,853,231 B2 * | 12/2020 | Guenther | ............. | G06F 11/3688 |
| 10,860,295 B1 * | 12/2020 | Ketireddy | ............. | G06F 8/35 |
| 10,990,370 B1 * | 4/2021 | Bawcom | ............. | H04L 41/0895 |
| 11,494,183 B1 * | 11/2022 | Smith | ............. | G06F 8/60 |

(Continued)

OTHER PUBLICATIONS

Ismail et al, "A Review on BIM-Based Automated Code Compliance Checking System", IEEE, pp. 1-6 (Year: 2017).*

(Continued)

*Primary Examiner* — Anil Khatri
(74) *Attorney, Agent, or Firm* — Buckley, Maschoff & Talwalkar LLC (57) ABSTRACT Systems and methods include reception of a first request to check code associated with a first service for compliance with one or more criteria, determination of a plurality of code components associated with the first service, execution of a code check of each of the plurality of code components, generation of a first service compliance statement associated with the first service based on results of the executed code checks, determination of a definition of the first product from a product repository, the definition listing a plurality of services on which the product depends, the plurality of services including the first service, identification of a compliance statement associated with each of the plurality services, and determination of a product compliance statement based on each of the identified compliance statements.

16 Claims, 10 Drawing Sheets (56) References Cited

U.S. PATENT DOCUMENTS

| | | | |
|---|---|---|---|
| 11,531,539 B2 * | 12/2022 | Crabtree | G06F 11/3616 |
| 2016/0139902 A1 * | 5/2016 | Dimitrakos | G06F 8/61 |
| | | | 717/120 |
| 2019/0303623 A1 * | 10/2019 | Reddy | G06F 8/71 |

OTHER PUBLICATIONS

Zhang et al, "Automatic Checking of License Compliance", IEEE, pp. 1-3 (Year: 2010).*
Gallina et al, "Compliance of Agilized (Software) Development Processes with Safety Standards: a Vision", ACM, pp. 1-6 (Year: 2018).*
Singi et al, "Compliance Adherence in Distributed Software Delivery: a Blockchain Approach", ACM, pp. 126-127 (Year: 2018).*
Jorshari et al, "A High Level Scheme for Ontology Based Compliance Framework in Software Development", ACM, pp. 1479-1487 (Year: 2015).*
Moyon et al, "Towards Continuous Security Compliance in Agile Software Development at Scale", ACM, pp. 31-34 (Year: 2018).*

\* cited by examiner

COMPLIANCE ASSESSMENT AND SIMULATION SYSTEM

BACKGROUND

An organization must comply with the legal and regulatory requirements of each jurisdiction in which the organization operates. Accordingly, software applications used by such an organization must also comply therewith. Software applications must also comply with constraints specified in customer contracts. For example, a customer contract may include an "EU Access only" option, which blocks access to users who are not physically present in the EU, or may guarantee deployment to certain countries or regions (e.g., US or EU).

The compliance posture of a software application may change for many independent reasons. In one example, the laws or regulations of a particular country or industry may change over time. Additionally, an organization may begin operating in a new region or a new (e.g., more strictly regulated) industry. A new software version may include new libraries or call new services. A change in the deployment landscape (e.g., new data centers, infrastructure providers or storage solutions) may require deployment of the software application to a new region. Customer contracts may be modified to add or remove certain requirements.

Ensuring compliance is an ongoing and multi-dimensional task which requires significant resources and can be difficult to properly execute. These characteristics are exacerbated in the case of software applications which are used by multiple organizations across several regions and industries. This situation is further complicated in the case of a software application whose compliance depends on where it is deployed, how it is operated, and which features customers have chosen to activate. Systems are desired to efficiently assess compliance at the various stages of a software application lifecycle, including development, deployment, onboarding and operations.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments provide a compliance assessment system which can be called at any stage of a software application lifecycle to assess an application's compliance in a manner which considers all of its dependencies and deployments. Generally, the system may access and update data representing the application, including but not limited to its code, bill-of-materials (BOM), deployment configuration, landscape data, and operations and support team locations. A set of policies can be defined to assess compliance with any regulations, whether currently required or anticipated. The policies can be evaluated with respect to the application in view of the above-described data during build, upon deployment, during operations and support, during customer onboarding, and in response to application customizing.

In a case that a software application is used by a broad range of customers residing in different countries and under different contract terms, any changes to the software application must consider the respective compliance requirements of all customers. However, all deployments of the application need not comply with the requirements of each customer. Rather, the assessment may indicate, for example, that certain application functions should not be activated for certain customers, that only a subset of current deployments should be offered to certain customers, or that the software application requires modification to guarantee compliance.

Embodiments may also provide a simulation feature to assess the impact of proposed changes to the application, deployment, etc. on the overall compliance status. For example, in order to assess the impact of an upcoming legal change on the overall compliance status, a development team may temporarily add a new policy corresponding to the legal change and perform an overall assessment in view of the new policy.

In another scenario, the development team may desire to enhance the software application with new functionality that requires the use of additional software libraries or services. Accordingly, a BOM of the enhanced application is created and an assessment is performed in view of the new BOM to determine whether use of the enhanced application would break compliance for the customers of the application.

Figure 1:
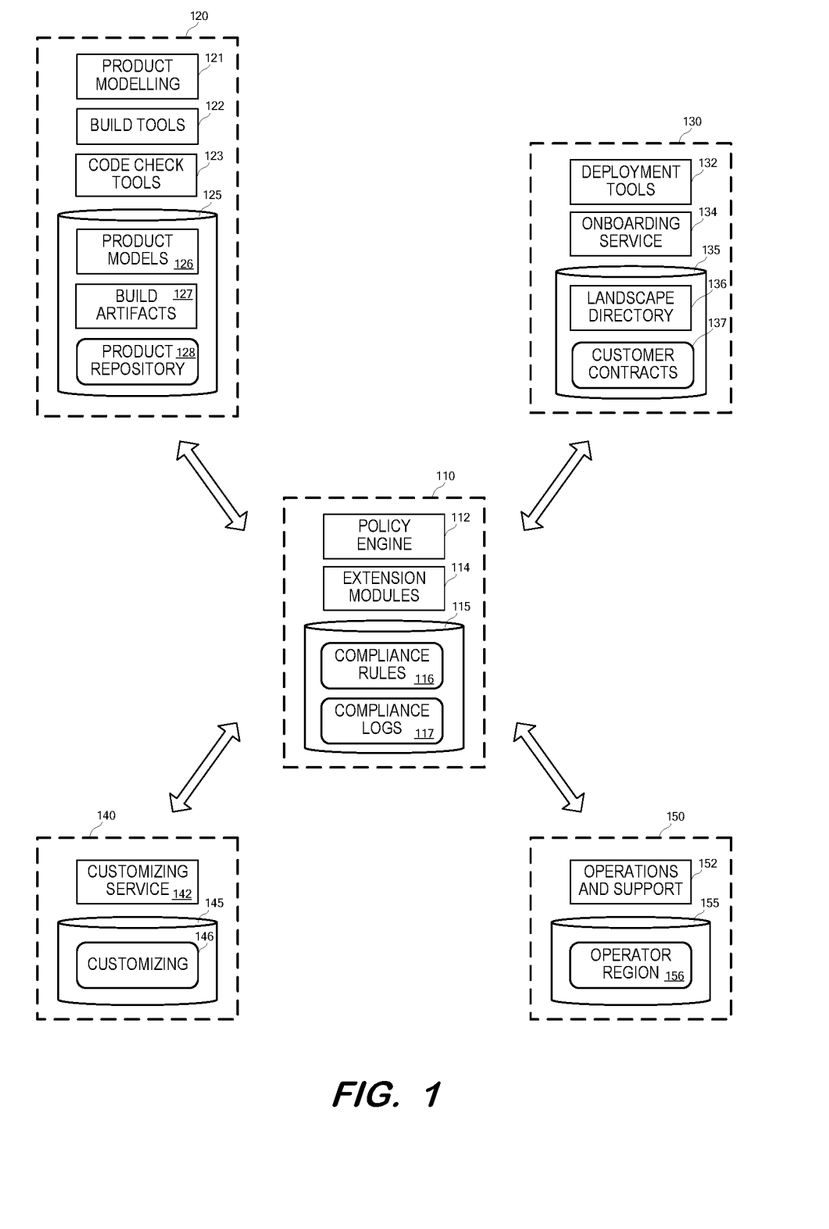
FIG. 1 is a block diagram of an architecture of a compliance assessment system according to some embodiments.

FIG. 1 is a block diagram of an architecture of a compliance assessment system according to some embodiments. The architecture consists of computing systems 110, 120, 130, 140 and 150, each of which provides one or more software-based services. Embodiments are not limited to the distribution of functionality and data storage depicted in FIG. 1. For example, a single computing system may execute program code and/or store data depicted in two or more computing systems of FIG. 1.

The dashed lines surrounding each computing system are intended to indicate that each computing system may be implemented using any suitable combination of computing hardware and/or software that is or becomes known, including distributed systems (e.g., compute, storage). Such a combination may include cloud-based implementations in which computing resources are virtualized and allocated elastically. In some embodiments, two or more elements of a system are implemented by a single computing device. One or more systems may be implemented as a cloud service (e.g., Software-as-a-Service, Platform-as-a-Service). Computing systems 110, 120, 130, 140 and 150 may communicate with one another according to Web communication protocols, but embodiments are not limited thereto.

Computing system 110 executes policy engine 112 to evaluate a product with respect to compliance rules 116. The term "product" will be used to refer to a software application in the examples below. However, embodiments may be used to assess compliance of any products other than software applications with respect to any applicable criteria, including but not limited to laws and regulations. Moreover, each component described herein as performing a respective function may comprise program code executable by a processing unit of a computing system to cause the computing system to provide the function.

Policy engine 112 executes compliance rules 116 according to some embodiments. Compliance rules 116 may be updated from time-to-time due to changes in applicable criteria (e.g., laws and/or regulations). Execution of compliance rules 116 with respect to a particular product may require acquisition of data which is associated with the product and stored in computing systems 120 through 150. Execution may also include writing compliance-related data to computing systems 120 through 150. Such acquisition and writing may be facilitated using extension modules 114, which interface with corresponding components of computing systems 120 through 150. Compliance logs 117 store results of compliance rule executions.

Computing system 120 includes product modelling 121, build tools 122, and code check tools 123. Product modelling 121 and build tools 122 may comprise components of an integrated development environment as is known in the art. A developer may operate product modelling 121 to define code, libraries and dependencies of a given software application and to store the definition in product models 126. Build tools 122 may be operated as is known in the art to construct build artifacts 127 from a product model 126.

Product repository 128 stores descriptive data associated with the products of product models 126. As will be described below, the data of product repository 128 may be read and/or updated during assessment processes according to some embodiments. In this regard, code check tools 123 may be operated to evaluate software application code for compliance with given requirements, and to create a corresponding compliance statement for storage in product repository 128.

An administrator may operate deployment tools 123 to deploy an application to a landscape. Details describing the deployment (locations, configurations, etc.) may be stored in landscape directory 136. An administrator may also operate onboarding service 134 to add new customers and/or specific users to a deployed application. Such onboarding may be subject to constraints and requirements specified by customer contracts 137, each of which may be associated with a customer and a given one or more applications.

Customizing service 142 may be operated to customize features of a deployed application. In one example, customization includes activating or de-activating a feature of an application. Customizations to a particular product are described in customizing data 146. The described customizations may be customer-specific and thereby enable customer-specific compliance evaluations of customized applications.

Operations and support 152 allows an operations team to access a deployed software application. Operator region data 156 associates members of the operations team with their respective locations. Using this information, policy engine 112 may determine that compliance requirements (e.g., specified in a corresponding customer contract 137) prohibit a certain operations team member from accessing a particular deployment.

Figure 2:
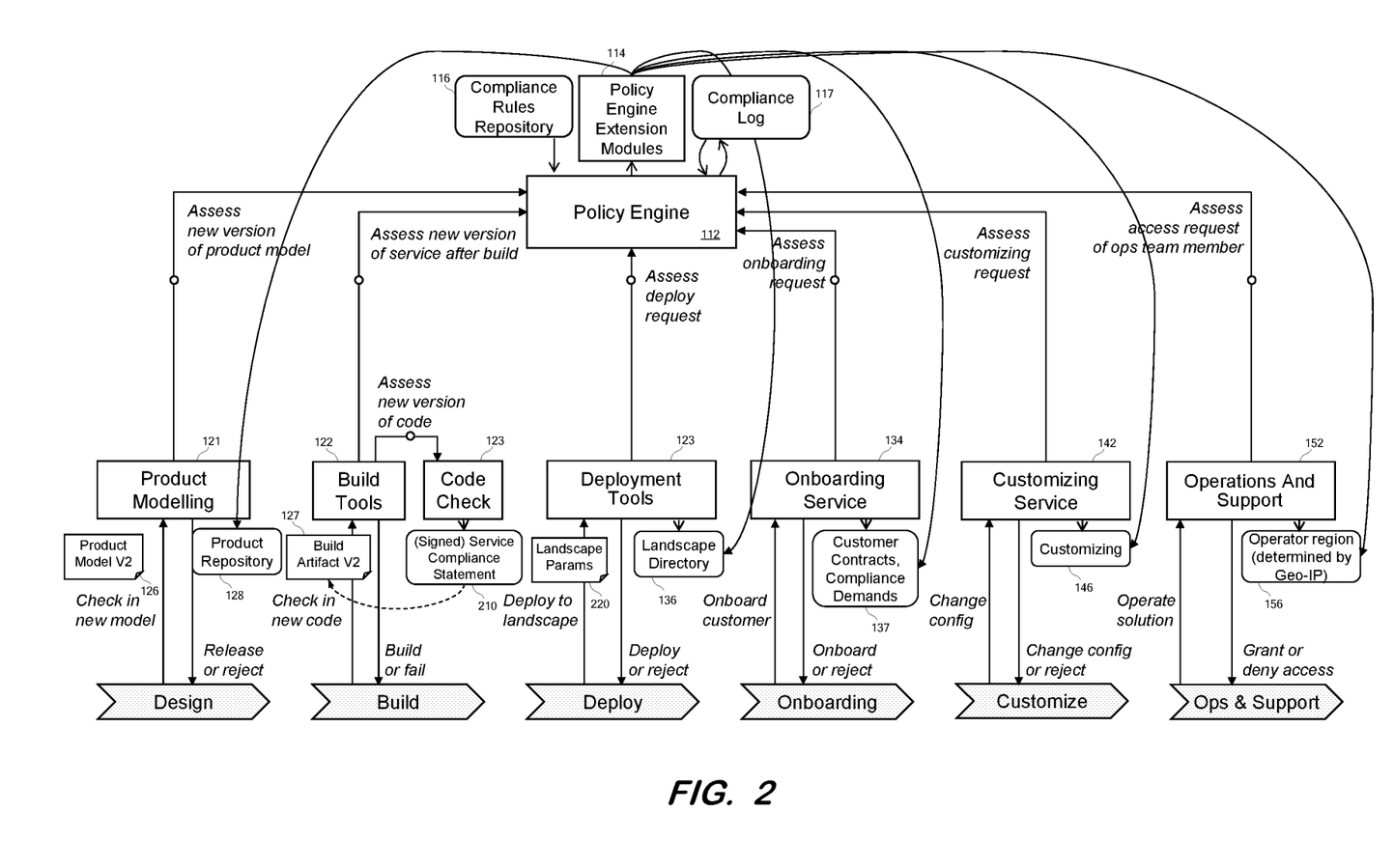
FIG. 2 illustrates usage of a compliance assessment system during various stages of an application lifecycle according to some embodiments.

FIG. 2 illustrates usage of a compliance assessment system during various stages of an application lifecycle according to some embodiments. The lifecycle stages are represented as Design, Build, Deploy, Onboarding, Customize and Ops & Support in FIG. 2.

As illustrated, some embodiments provide a compliance assessment system by enhancing a generic policy engine (e.g., an Open Policy Agent) 112 with specific extension modules 114 that provide domain-specific data from connected systems. Policy engine 112 uses the data to evaluate centrally-managed compliance rules 116 for each compliance requirement during each lifecycle stage. A compliance assessment may include a specification, a landscape, a customer base, and an indication of whether the assessment is a "what-if" assessment or an assessment of an actual product. Compliance assessments may be logged securely in compliance log 117 in an audit-compliant manner.

Examples of extension modules 114 include to a code check extension module which has access to product code 127 and to information regarding referenced libraries such as the library code and/or compliance statements provided by the library developers. The code check extension module may provide a compliance statement for a product version based on its code and used libraries, and may be capable of checking code conforming to different programming languages (e.g., Java, C++).

A "compliance statement" can be created and signed so that it can be used as a reliable source in assessments performed at later lifecycle stages. For example, reuse libraries can be code signed and application container images can be signed and stored in certified container registries.

A product extension module may have access to a product model 126, or BOM, specifying constituent applications, their services and used services. The product extension module may provide a compliance statement for the entire modeled product version, which covers its applications and used services.

A landscape extension module has access to landscape directory 136, specifying a deployment location (including the physical region, e.g., country), version, and associated customers for each deployed service instance and product instance. The landscape extension module may also have access to product and service compliance statements for the instances deployed to various regions, and the location of operations personnel for the product for each deployment location of the product instances.

The landscape extension module is capable of providing an assessment of whether any instance of a product is operated by personnel working within or outside of a certain region, and also of providing a statement indicating whether access to a set of product and service instances can be provided to operations/support personnel located in a certain region, in a case that such access is subject to GEO-IP-restrictions. Using data from the below-described contract extension module, the landscape extension module may also assess the access by personnel in certain regions for certain instances in view of the contractual guarantees made to customers associated with the product.

A contract extension module may access a customer relationship system which stores compliance demands 137 for individual customers. The compliance demands can be legal and/or contractually-defined regulations. Accordingly, the contract extension module may provide compliance demands associated with given customer identifiers.

The contract extension module may also, using data received from the product extension module, provide a list of customer identifiers whose compliance demands will not be fulfilled in view product compliance statements associated with a particular (e.g., potential future) product. Moreover, using data accessed by the landscape extension module, the contract extension module may provide an assessment of whether selected product and service instances are compliant with a particular customer's compliance demands.

A customizing extension module may access product definitions and feature toggle definitions in customizing data 146. These definitions may specify the compliance aspects of services and applications (as defined by the product definition) which will be affected by switching on or off a given feature toggle. The customizing extension module may assess, in combination with the contract extension module, whether the compliance demands of a particular customer will remain satisfied if a particular feature toggle is switched. The customizing extension module may also assess, in combination with the landscape extension module, whether access to a set of product and service instances can be provided to operations/support personnel in a given region if a particular feature toggle is switched.

Operation of a compliance assessment system at various lifecycle stages according to some embodiments will now be described with respect to FIG. 2. At the Design stage, a new version of a product definition, or product model, can be created in anticipation of future build and deployment. Before the new version of the product model is released to the next lifecycle stage (i.e., Build), the new version should be checked for compliance.

Accordingly, Product Model v2 is checked-in to product modelling component 121, which requests assessment of the new model version from policy engine 112. Policy engine 112 uses the product extension module to access data (e.g., library information) from product repository 128 for use in evaluating corresponding compliance rules 116. If the model includes a not-yet-available component (e.g., a component which will be built during the Build stage), the compliance assessment of that component will be performed at a later stage.

At the Build stage, build tools 122 tool will receive a new version of the code, run a code check using code check tool 123, and create a new build artifact 127 for later deployment. After the code check, code check tool 123 creates signed compliance statement 210 associated with the new code. The statement 210 may indicate, e.g., that the code is FIPS-compliant and not GDPR-compliant.

If code check tool 123 cannot check the code, the compliance statement may be created by the code developers. The code developers may need to evaluate required additional components according to the corresponding the product model in order to create an accurate compliance statement.

Build tools 122 may request assessment of the new version of the software artifact (e.g., Service) from policy engine 112. Such an assessment may execute compliance rules 116 to determine whether the new compliance statement would violate any compliance demands of existing customers of the product. For example, the compliance statement may tag the new version as "GDPR relevant" as it now handles privacy-related data, but not as "GDPR compliant". Accordingly, the product version must not be deployed to instances of customers who use the service and reside in the EU, since such deployment would violate a compliance demand.

At the Deploy stage, deployment tools 123 will request an assessment of whether the software artifacts may be deployed according to desired landscape parameters 220. Landscape parameters 220 may specify data center locations for the artifact instances and the assessment will assess whether deployment to these locations is compliant. For example, an export control classification compliance rule may limit deployment of encryption software to certain regions.

A customer is onboarded to a product at the Onboarding stage. Onboarding grants the customer their own tenant instances and access to services. The customer is associated with a set of compliance demands 137, which may be contractual. Onboarding service 134 therefore requests assessment of an onboarding request by policy engine 112 in order to determine whether the provisioned product complies with the customer-specific compliance demands.

Using customizing service 142, a key user of a customer may configure a product to the needs of the customer at the Customize lifecycle stage. Configuration may include switching on optional product features (e.g., conversational AI using natural language processing). The switched-on features must also satisfy applicable customer compliance demands. Legal and regulatory considerations should also be checked, as an optional product feature may be, for example, legally useable in only certain countries. Accordingly, customizing service 142 requests a compliance assessment from policy engine 112 based on the desired customizations.

After product deployment and any customization, an operations or support engineer might be assigned a task which requires access to a service or application tenant. Applicable criteria or compliance demands may limit access to customer systems for certain groups or people in certain regions. For the contractual demand "EU-access only" may guarantee to a customer that only personnel located in the EU will access the customer system and support-ticket information regarding the product. Thus, before access can be granted to the operations or support engineer, policy engine 112 may be asked to determine the applicable criteria by determining to which customer the tenant/service is assigned and determining the criteria which are required for this customer. Policy engine 112 may also determine the location of the engineer using GEO-IP information 156, and then use all the determined information to evaluate a corresponding compliance rule 116.

Figure 3:
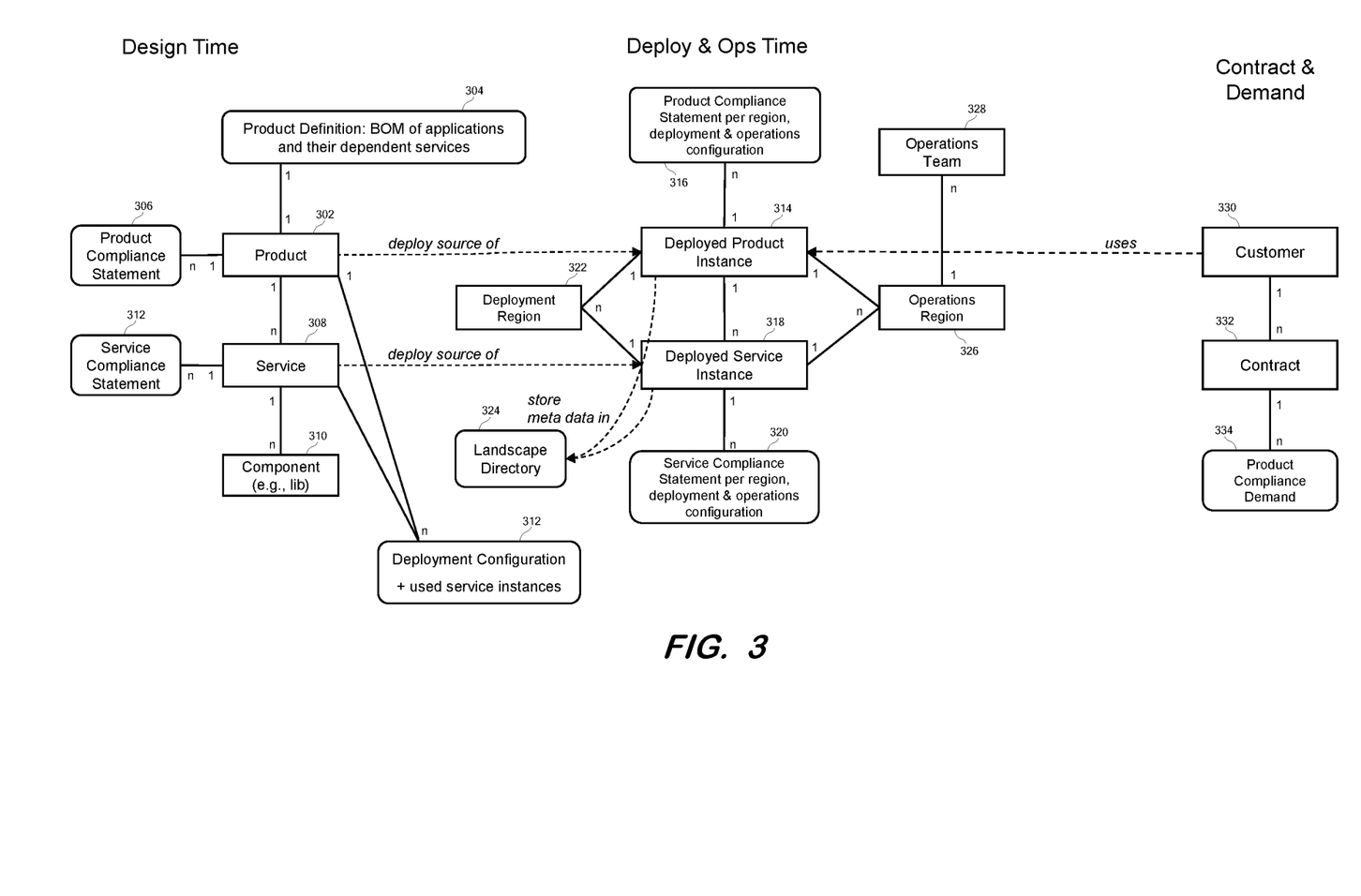
FIG. 3 is a view of a data model of a compliance assessment system according to some embodiments.

FIG. 3 is a view of a data model of a compliance assessment system according to some embodiments. The data model is separated into design time elements, deploy and ops time elements, and contract and demand elements, and FIG. 3 illustrates the relationships between the elements.

Each product 302 is associated with a single BOM 304 defining which applications are part of the product, and which services are used by the product. A BOM 304 may indicate which components of a product can be selectively switched on (i.e., activated) or switched off (i.e., deactivated). If the product has some components that would violate certain requirements or regulations for certain customers then those components may be switched off for those customers and switched on for other customers. Each product 302 is associated with n services 308, and each service 308 is associated with n constituent components, e.g., libraries.

Each product 302 and service 308 may be associated with n compliance statements 306 and 312, respectively. Compliance statements 306 and 312 relate to policies which can be assessed based solely on the code of their associated product 302 and service 308. Each product 302 and service 308 may be associated with a set of deployment configurations 312. The deployment configurations 312 are read by deployment tools 123 to deploy a product 302 and a service 308 into the various data centers with desired configurations.

Deployed product instance 314 and deployed service instance 318 can be deployed to one or more regions 326, and one or more operations teams 328 can be located in each of the one or more regions 326. Meta data associated with deployed instances 314 and 318 is stored in landscape directory 324. Such meta data may specify, for example, product version, instance ID, data center, tenant ID, etc.

Each deployed product instance 314 and deployed service instance 318 is associated with a respective compliance statement 316, 320. Compliance statements 316, 320 relate to compliance issues associated with deployment and operations. For example, statements 316, 320 may indicate whether a "restricted access only" compliance demand is satisfied.

Figure 4:
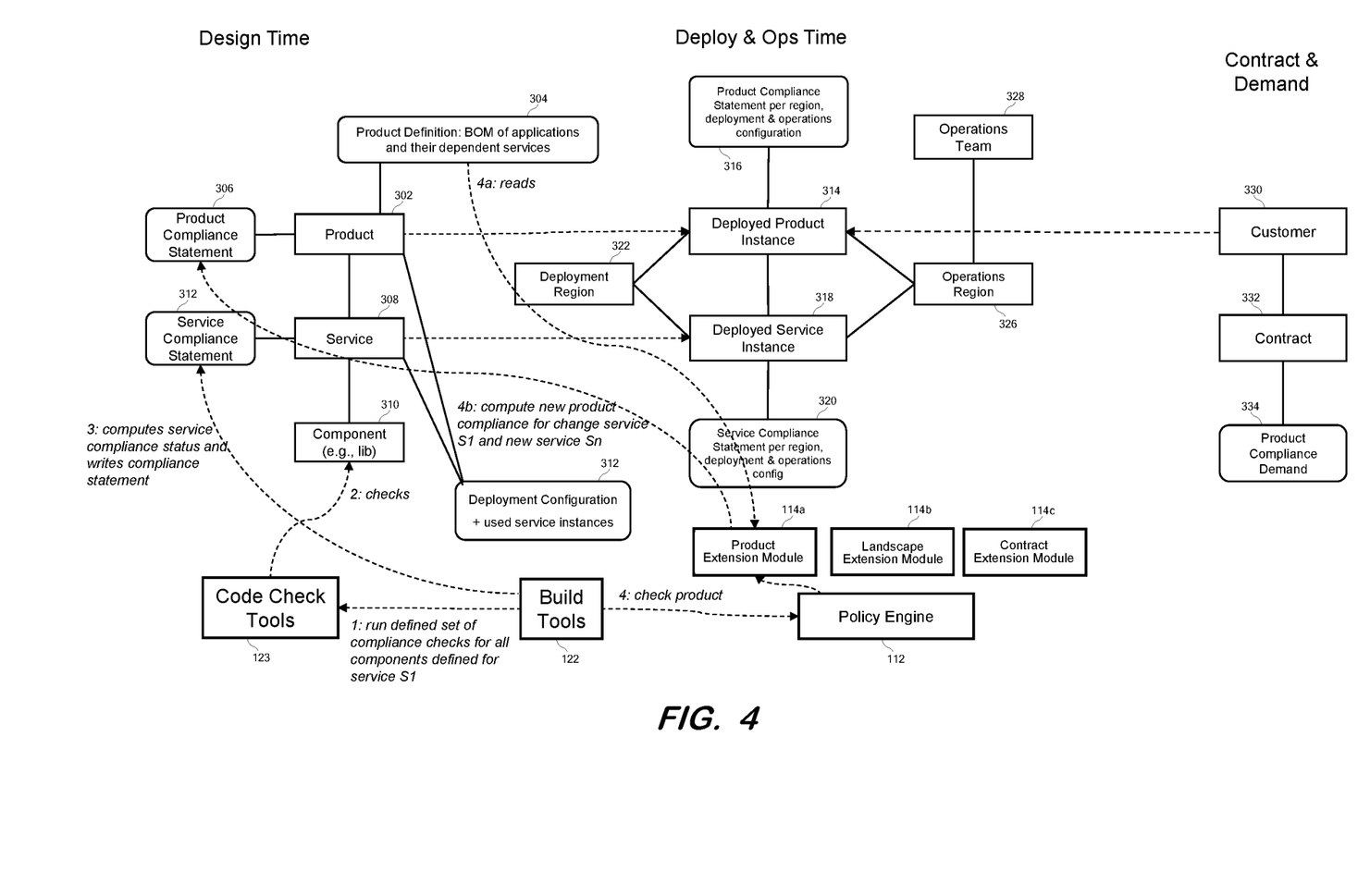
FIGS. 4 and 5 illustrate usage of a data model of a compliance assessment system during design and build stages of a product lifecycle according to some embodiments.

A customer 330 uses a deployed product instance 314 and its related deployed service instances 318. A customer 330 is associated with one or more contracts 332, and each contract 332 will specify one or more product compliance demands 334. A compliance demand 334 may be implicit (i.e., not explicitly specified in a corresponding contract 332) in view of the customer region (e.g., GDPR compliance required in the FIGS. 4 and 5 illustrate usage of a data model of a compliance assessment system during design and build stages of a product lifecycle service 51 according to some embodiments.

It will be assumed that existing service 51 has been changed by adding service Sn as a new component thereof. Therefore, as shown in FIG. 4, build tools 122 instruct code check tools 123 to run a defined set of compliance checks of the components of service 51. In response, code check tools 123 access components 310 associated with the instance of service 308 which represents service 51 (which include service Sn), and runs the compliance checks on those components 310. Build tools 122 then compute a service compliance status based on the results of the code checks and generates a corresponding service compliance statement 312 associated with service 51. In some embodiments, the service compliance statement 312 is signed to ensure that it cannot be modified without detection.

Next, build tools 122 transmit a request to policy engine 112 to perform a compliance assessment on an instance of product 302. Accordingly, policy engine 112 accesses product extension module 114a, which reads the BOM 304 associated with the product 302 to determine that the product 302 includes service 51. Product extension module 114a then computes a new product compliance statement 308 for the product 302 based on the compliance statement computed for service 51.

Figure 5:
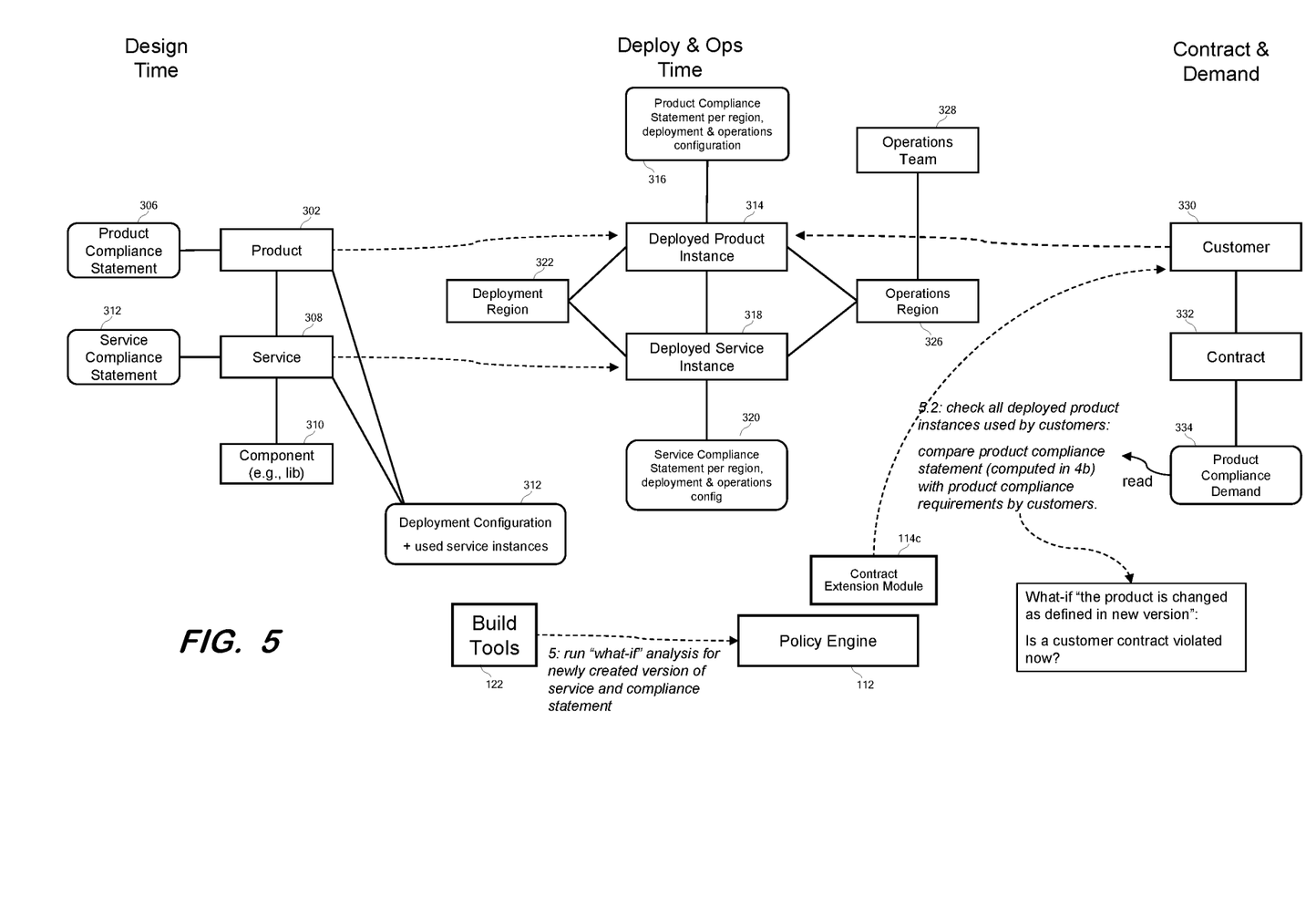

FIG. 5 shows a request from build tools 122 to policy engine 122 to run a "what-if" analysis based on the newly-created version of service 51 and its newly-created compliance statement. In order to conduct the analysis, contract extension module 114c accesses customers 330 to determine all customers who are using a deployed instance of the associated product. The product compliance demands 334 of each determined customer are compared with the product compliance statement generated in FIG. 4 to determine whether the new version of the product will continue to conform to all applicable product compliance demands.

Figure 6:
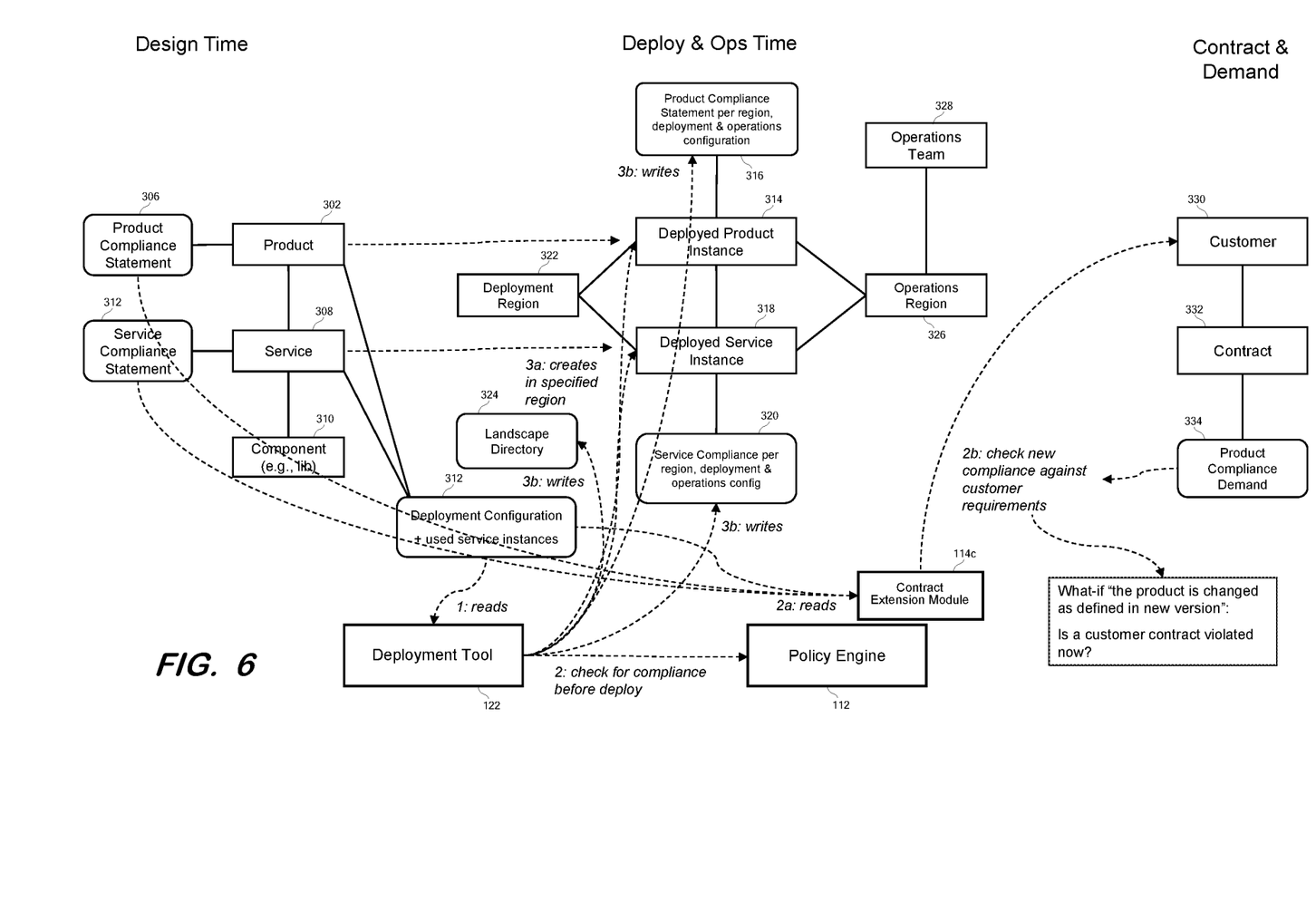
FIG. 6 illustrates usage of a data model of a compliance assessment system during a deployment stage of a product lifecycle according to some embodiments.

FIG. 6 illustrates usage of a data model of a compliance assessment system during a deployment stage of a product lifecycle according to some embodiments. To initiate deployment, deployment tool 122 reads a deployment configuration 312 associated with a product 302 and each of its services 308. Next. deployment tool 122 transmits a request to policy engine 112 to assess compliance of the product prior to deployment.

In response to the request, contract extension module 114c reads the product compliance statement 306 of the product 302 and the service compliance statement 312 of each service 308 of the product 302. Contract extension module 114c also reads the deployment configuration 312 of the product 302 and each of its services 308.

Next, as described above, contract extension module 114c accesses customers 330 to determine all customers who are using a deployed instance of the product. The product compliance demands 334 of each determined customer are compared with the product compliance statement 312 to determine whether the new version of the product will continue to conform to all applicable product compliance demands.

It will be assumed that the product compliance demands are met. Deployment tool 122 therefore deploys product instances 314 and service instances 318 in their specified regions. Deployment tool 122 also writes to landscape directory 324 to record the deployment details, and writes to product compliance 316 and service compliance 320 to indicate compliance of the product and its associated services with region, deployment and operations configuration-related compliance demands.

Figure 7:
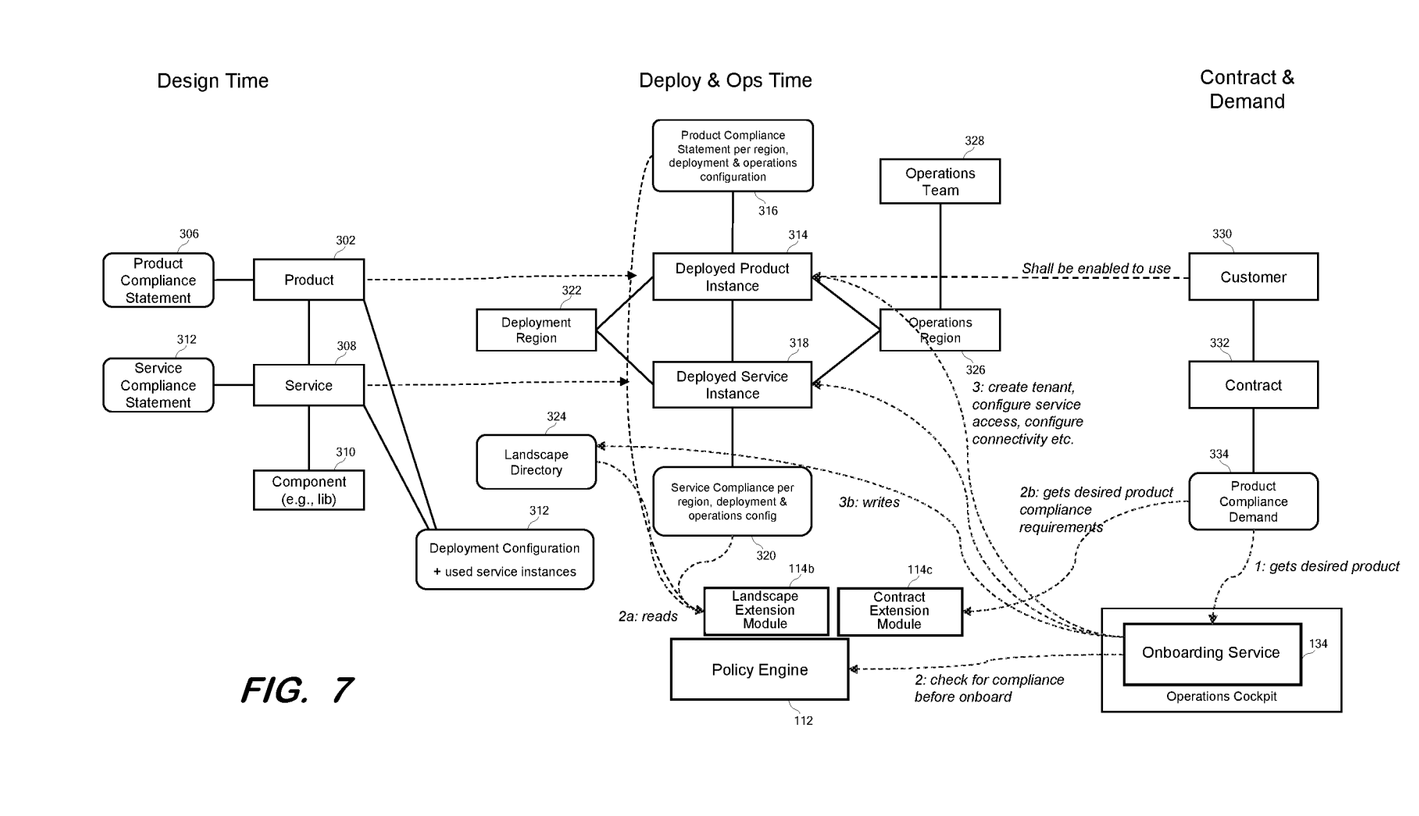
FIG. 7 illustrates usage of a data model of a compliance assessment system during an onboarding stage of a product lifecycle according to some embodiments.

FIG. 7 illustrates usage of a data model of a compliance assessment system during an onboarding stage of a product lifecycle according to some embodiments. To onboard a new customer to a product (i.e., to enable a customer 330 to use a deployed product instance 314), onboarding service 134 receives an indication of the customer, the product, and an associated contract.

Onboarding service 134 requests policy engine 112 to conduct a compliance check prior to onboarding the customer. In response, landscape extension module 114b reads landscape directory 324 and compliance statements 316 and 320 associated with the product and its services. Contract extension module 114c acquires the product compliance demands 334 associated with the customer and the contract. Policy engine 112 then evaluates the acquired product compliance demands 334 against the landscape meta data and the compliance statements.

Assuming that policy engine 112 indicates that all product compliance demands are met, onboarding service 134 creates a tenant in and configures access and connectivity with a corresponding deployed product instance 314 and its corresponding deployed service instances 318. Onboarding service 134 also indicates the new customer in the meta data of landscape directory 324.

Figure 8:
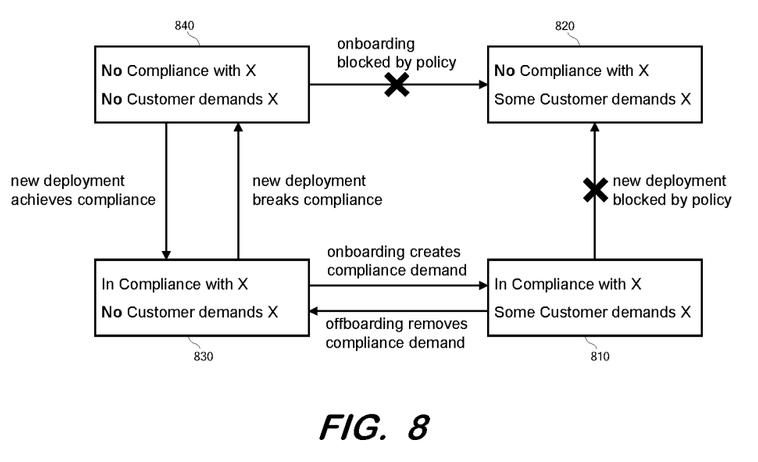
FIG. 8 is a state transition diagram illustrating the dependencies between product compliance offerings and customer compliance demands according to some embodiments.

FIG. 8 is a state transition diagram illustrating the dependencies between product compliance and customer compliance demands according to some embodiments.

State 810 represents a system in compliance with a certain policy X where at least one customer demands X. The deployment of a change resulting in non-compliance with X would transition the system to state 820, and therefore the deployment should be blocked. If all the customers who demand X are offboarded, the system transitions to state 830.

At state 830, the system is in compliance with X, but no customer demands X. If a customer demanding X is onboarded, the system returns to state 810. On the other hand, if a change is deployed resulting in non-compliance with X is possible, the system transitions to state 840, in which the system is not compliant with X, but no customer demands X.

The system transitions from state 840 to state 830 if a change is deployed which results in the system being compliant with X. However, as indicated in FIG. 8, the onboarding of a customer demanding X while in state 840 must be prevented, to avoid transitioning to undesired state 820.

Figure 9:
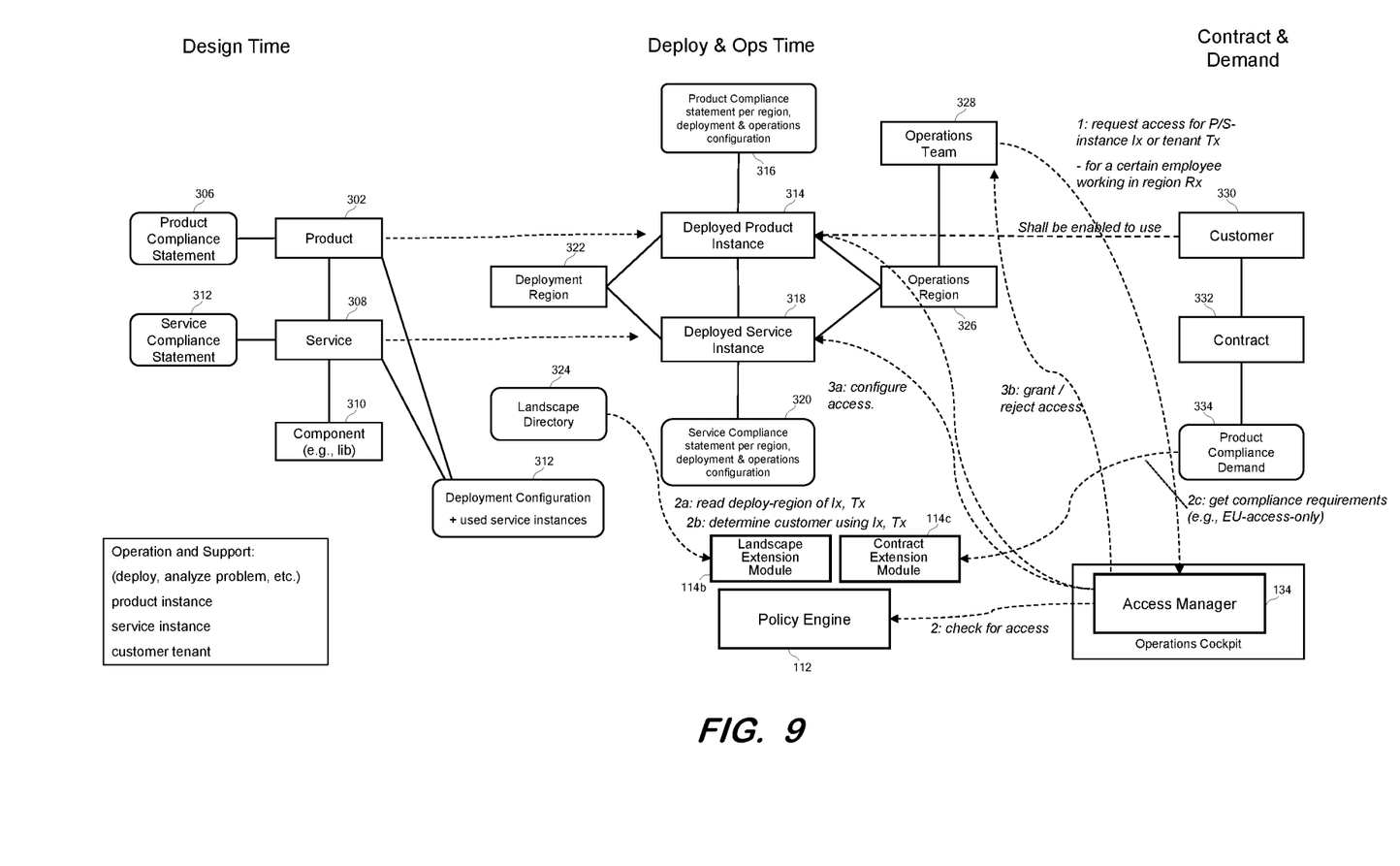
FIG. 9 illustrates usage of a data model of a compliance assessment system during an operations and support stage of a product lifecycle according to some embodiments.

FIG. 9 illustrates usage of a data model of a compliance assessment system during an operations and support stage of a product lifecycle according to some embodiments. In particular, access manager 134 receives a request from an operations team 328 for access of a particular team member located in a specific region to a deployed product/service instance or to a particular tenant. In response, access manager 134 requests policy engine 112 to assess compliance in view of the requested access.

Landscape extension module 114b accesses landscape directory 324 to determine the region in which the product or tenant instance is located, and to determine the customer using the product or tenant instance. Next, contract extension module determines product compliance demands 334 associated with the customer. Such a product compliance demand 334 may require access of the instances by EU-located personnel only.

If policy engine 112 indicates that granting the request for access would violate the product compliance demands, access manager 134 communicates with the operations team 328 to reject the request. If policy engine 112 determines that access would not violate the product compliance demands, access manager configures deployed product and service instances 314 and 318 for such access, and communicates with the operations team 328 to indicate granting of the request.

The following is an example of usage of a compliance assessment and simulation system according to some embodiments. Embodiments are not limited thereto.

The example assumes a Software-as-a-Service product P used by a broad customer base, distributed in different regions and associated with different contracts specifying respective compliance demands. A development team is asked to extend the product P in a new version which encrypts personally-related data of European customers which have a GDPR compliance requirement.

The development team decide to implement his functionality in a reusable service Sn. The team queries a policy engine of a compliance assessment and simulation system to determine whether there are customers of P that require GDPR and also require FIPS. The policy engine uses extension modules to read the compliance demands of the customers of P as defined in the corresponding contracts of the customers. The compliance demands show that there are several customers who require FIPS.

The team identifies a FIPS-compliant library that can facilitate implementation of the new service Sn. However, the library is constrained by export control to certain countries. The team queries the policy engine again, which identifies from the landscape directory the deployed instances of P used by those customers that require GDPR and determines that none of these customers uses instances of P in countries in which the library is unusable due to export control. Other customers, who do not require the new functionality, are located in some of those critical countries. Consequently, the team decides to build the service with the library but to deliver the new version of P with a feature toggle to activate or de-activate Sn depending on the different compliance demands of a given customer.

The development team creates a new Continuous Integration (CI) build pipeline for the library. It manually attaches the Export Control Classification Number (ECCN) flag to ensure that the build result will not be exported accidentally when it is embedded in other components. When the build pipeline is executed, a check tool verifies FIPS compliance and, as a result, the build associates a compliance statement indicating the library is ECCN-restricted and FIPS-compliant and signs the statement.

Next, the development team creates a CI/Continuous Development (CD) build and deployment pipeline for service Sn. The service includes the library and adds remote API boilerplate code that does not affect any compliance demands. The check tool finds no FIPS violations in the service code and, as the library was previously checked (which is validated by the signed compliance statement), the service is also signed as FIPS-compliant and ECCN-restricted.

When the deployment pipeline deploys service Sn to various countries, the ECCN restriction is always checked before deployment. If the development team accidentally included a restricted country in the deployment target list of the deployment pipeline, deployment to this country is stopped to prevent occurrence of a compliance violation.

The team may now configure the new version of the product P, adding Sn as a dependent service to the BOM associated with product P. Product P may also include a feature toggle for Sn that allows European customers to customize product P to include the personal data encryption functionality of service Sn. When the BOM is checked in, only the feature toggle-independent requirements are verified. For example, Sn will be checked for FIPS compliance since there are some customers of P that demand FIPS compliance. Since service Sn has already been tagged as FIPS-compliant, the BOM is updated as requested.

The updated BOM triggers a redeployment of product P. Redeployment also results in evaluation of the switch-dependent requirements. The service Sn is tagged as ECCN-restricted and FIPS-compliant. The service Sn cannot be switched on in ECCN-restricted countries, but it must be switched on if GDPR is required. These requirements are automatically fulfilled when the new version of product P is deployed, as the customizing extension module activates the configured customizing switch for all customers with a GDPR compliance requirement, validating at the same time that those customers are not using a deployment in one of the restricted countries.

Customers which are not associated with a GDPR compliance requirement can still switch on and off the service, as long as they are not using a deployment in a restricted country. In contrast, customers which are subject to a GDPR compliance requirement cannot switch the service off and customers in restricted countries cannot switch it on.

Figure 10:
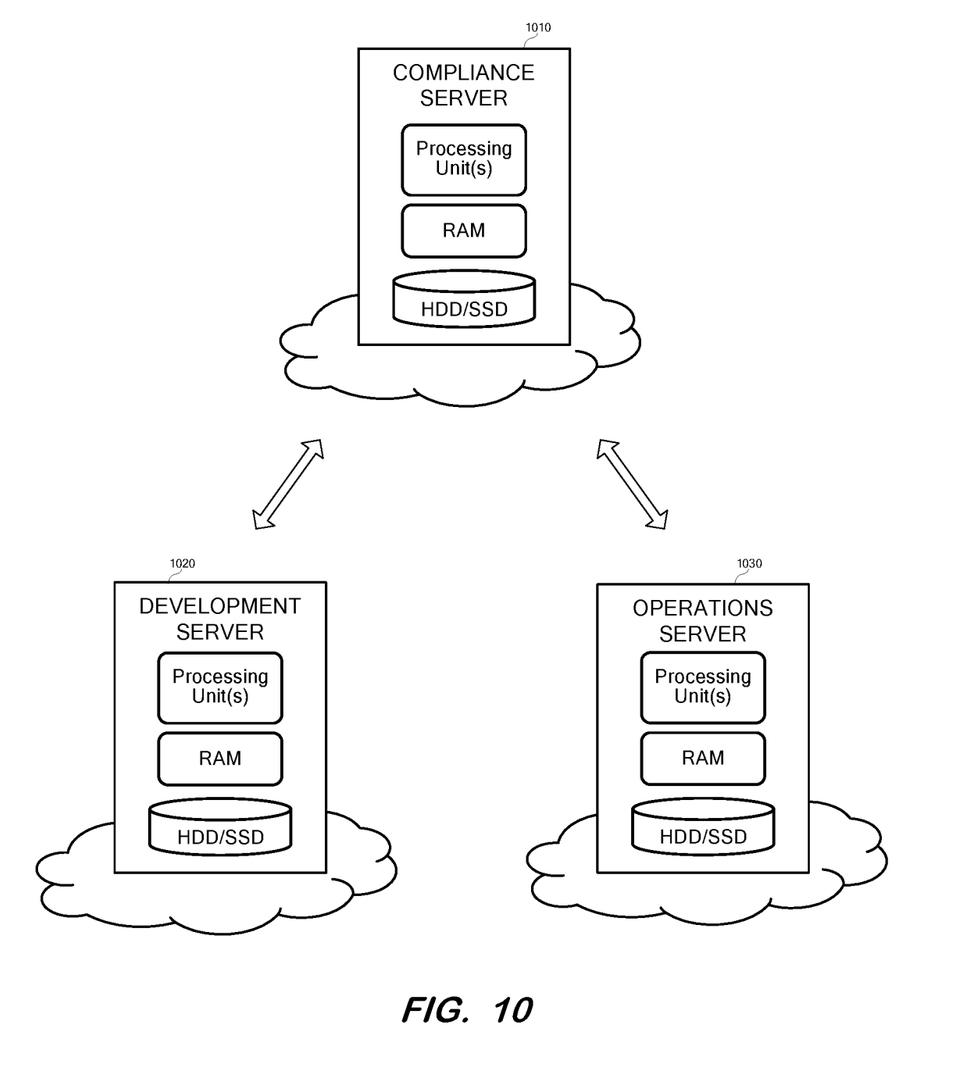
FIG. 10 is a block diagram of a hardware system according to some embodiments.

FIG. 10 illustrates a cloud-based database deployment according to some embodiments. The illustrated components may comprise cloud-based compute and storage resources residing in one or more public or private clouds providing self-service and immediate provisioning, autoscaling, security, compliance and identity management features.

Compliance server 1010 may execute a policy engine and extension modules based on compliance rules as described herein. Such execution may include communication with development server 1020, which may execute design, build, and code check tools and store corresponding repositories as described herein. Development server 1020 may request code-based compliance assessments from compliance server 1010. Operations server 1030 may provide deployment tools, a customizing service, and operations and support functionality, and may also request compliance assessments from compliance server 1010 as described herein.

All processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
 a code check system comprising:
 a first memory storing first processor-executable program code; and
 a first at least one processing unit to execute the first processor-executable program code to cause the system to:
 receive a first request to check code associated with a first service for compliance with one or more criteria; and
 in response to the first request:
 determine a plurality of code components associated with the first service;
 execute a code check of each of the plurality of code components;
 generate a first service compliance statement associated with the first service based on results of the executed code checks; and
 transmit a second request to check compliance of a first product associated with the first service; and
 a policy engine system comprising:
 a second memory storing second processor-executable program code; and
 a second at least one processing unit to execute the second processor-executable program code to cause the system to:
 receive the second request; and
 in response to the second request, read a definition of the first product, the definition listing a plurality of services on which the product depends, the plurality of services including the first service;
 execute compliance rules to assess compliance of the first product;
 identify a plurality of compliance statements, each of the plurality of compliance statements associated with a respective one of each of the plurality services; and
 determine a product compliance statement based on the assessed compliance of the first product, the first service compliance statement and the plurality of identified compliance statements,
 wherein in response to a determination that deployment of first product instances and a plurality of services instances according to a deployment configuration would not violate compliance demands of each customer associated with the of the first product instances, the first product instances and the plurality of services instances are deployed according to the deployment configuration.

2. A system according to claim 1, wherein the code check comprises a check for Federal Information Processing Standards (FIPS) compliance and for General Data Protection Regulation (GDPR) compliance.

3. A system according to claim 1, the second at least one processing unit to execute the second processor-executable program code to cause the system to:
 receive a third request to check compliance of deployment of the first product; and
 in response to the third request:
 determine the deployment configuration for the first product instances and the plurality of services instances;
 determine the compliance demands of each customer associated with the first product instances; and
 determine, based on the compliance statements associated with each of the plurality services and the product compliance statement, whether deployment of the first product instances and the plurality of services instances according to the deployment configuration would violate the compliance demands.

4. A system according to claim 3, further comprising:
 a deployment system comprising:
 a third memory storing third processor-executable program code; and
 a third at least one processing unit to execute the third processor-executable program code to cause the system to:
 transmit the third request;
 wherein the deployment system deploys the first product instances and the plurality of services instances according to the deployment configuration.

5. A system according to claim 4, the second at least one processing unit to execute the second processor-executable program code to cause the system to:
 receive a fourth request to check compliance of onboarding a first customer to a deployed first product instance; and
 in response to the fourth request:
 determine the deployment configuration of the first product instance;

determine a second product compliance statement associated with the first product and the deployment configuration of the first product instance;
determine compliance demands of the first customer; and
determine, based on the second product compliance statement, whether onboarding of the first customer would violate the compliance demands of the first customer.

6. A system according to claim 1, the second at least one processing unit to execute the second processor-executable program code to cause the system to:
receive a third request to check compliance of onboarding a first customer to a deployed first product instance; and
in response to the fourth request:
determine a deployment configuration of the first product instance;
determine a second product compliance statement associated with the first product and the deployment configuration of the first product instance;
determine compliance demands of the first customer; and
determine, based on the second product compliance statement, whether onboarding of the first customer would violate the compliance demands of the first customer.

7. A method comprising:
receiving a first request to check code associated with a first service for compliance with one or more criteria;
determining a plurality of code components associated with the first service;
executing a code check of each of the plurality of code components;
generating a first service compliance statement associated with the first service based on results of the executed code checks;
identifying, from a product repository, a first product which depends on the first service and a plurality of services on which the first product depends, the plurality of services including the first service;
executing compliance rules to assess compliance of the first product;
identifying a plurality of compliance statements, each of the plurality of compliance statements associated with a respective one of each of the plurality of services;
determining a product compliance statement based on the assessed compliance of the first product, the first service compliance statement and the plurality of identified compliance statements;
determining that deployment of first product instances and a plurality of services instances according to a deployment configuration would not violate compliance demands of each customer associated with the first product instances; and
in response to determining that deployment of the first product instances and the plurality of services instances according to the deployment configuration would not violate compliance demands of each customer associated with the first product instances, deploying the first product instances and the plurality of services instances according to the deployment configuration.

8. A method according to claim 7, wherein the code check comprises a check for Federal Information Processing Standards (FIPS) compliance and for General Data Protection Regulation (GDPR) compliance.

9. A method according to claim 7, further comprising:
determining the deployment configuration for the first product instances and the plurality of services instances;
determining the compliance demands of each customer associated with the first product instances; and
determining, based on the compliance statements associated with each of the plurality services and the product compliance statement, whether deployment of the first product instances and the plurality of services instances according to the deployment configuration would violate the compliance demands.

10. A method according to claim 8, further comprising:
receiving a second request to check compliance of onboarding a first customer to a deployed first product instance; and
in response to the second request:
determining the deployment configuration of the first product instance;
determining a second product compliance statement associated with the first product and the deployment configuration of the first product instance;
determining compliance demands of the first customer; and
determining, based on the second product compliance statement, whether onboarding of the first customer would violate the compliance demands of the first customer.

11. A method according to claim 7, further comprising:
receiving a second request to check compliance of onboarding a first customer to a deployed first product instance; and
in response to the second request:
determining the deployment configuration of the instance of the first product;
determining a second product compliance statement associated with the first product and the deployment configuration of the instance of the first product;
determining compliance demands of the first customer; and
determining, based on the second product compliance statement, whether onboarding of the first customer would violate the compliance demands of the first customer.

12. A non-transitory computer-readable medium storing processor-executable program code, the program code executable by a computing system to:
receive a first request to check code associated with a first service for compliance with one or more criteria;
determine a plurality of code components associated with the first service;
execute a code check of each of the plurality of code components;
generate a first service compliance statement associated with the first service based on results of the executed code checks;
identify, from a product repository, a first product which depends on the first service and a plurality of services on which the first product depends, the plurality of services including the first service;
execute compliance rules to assess compliance of the first product;
identify a plurality of compliance statements, each of the plurality of compliance statements associated with a respective one of each of the plurality of services;
determine a product compliance statement based the assessed compliance of the first product, the first service compliance statement and of the plurality of identified compliance statements;
determine that deployment of first product instances and a plurality of services instances according to a deployment configuration would not violate compliance demands of each customer associated with the first product instances; and in response to the determination that deployment of first product instances and a plurality of services instances according to a deployment configuration would not violate compliance demands of each customer associated with the first product instances, deploy the first product instances and the plurality of services instances according to the deployment configuration.

13. A non-transitory medium according to claim 12, wherein the code check comprises a check for Federal Information Processing Standards (FIPS) compliance and for General Data Protection Regulation (GDPR) compliance.

14. A non-transitory medium according to claim 12, the program code executable by a computing system to:

determine the deployment configuration for the first product instances and the plurality of services instances;

determine the compliance demands of each customer associated with the first product instances; and determine, based on the compliance statements associated with each of the plurality services and the product compliance statement, whether deployment of the first product instances and the plurality of services instances according to the deployment configuration would violate the compliance demands.

15. A non-transitory medium according to claim 14, the program code executable by a computing system to:

receive a second request to check compliance of onboarding a first customer to a deployed first product instance; and in response to the second request:

determine the deployment configuration of the first product instance;

determine a second product compliance statement associated with the first product and the deployment configuration of the first product instance;

determine compliance demands of the first customer; and determine, based on the second product compliance statement, whether onboarding of the first customer would violate the compliance demands of the first customer.

16. A non-transitory medium according to claim 12, the program code executable by a computing system to:

receive a second request to check compliance of onboarding a first customer to a deployed first product instance; and in response to the second request:

determine the deployment configuration of the first product instance;

determine a second product compliance statement associated with the first product and the deployment configuration of the first product instance;

determine compliance demands of the first customer; and determine, based on the second product compliance statement, whether onboarding of the first customer would violate the compliance demands of the first customer.

\* \* \* \* \*